G. M. ROGERS.
MACHINE OILER.
APPLICATION FILED OCT. 23, 1915.
1,186,439.
Patented June 6, 1916.
2 SHEETS—SHEET 1.
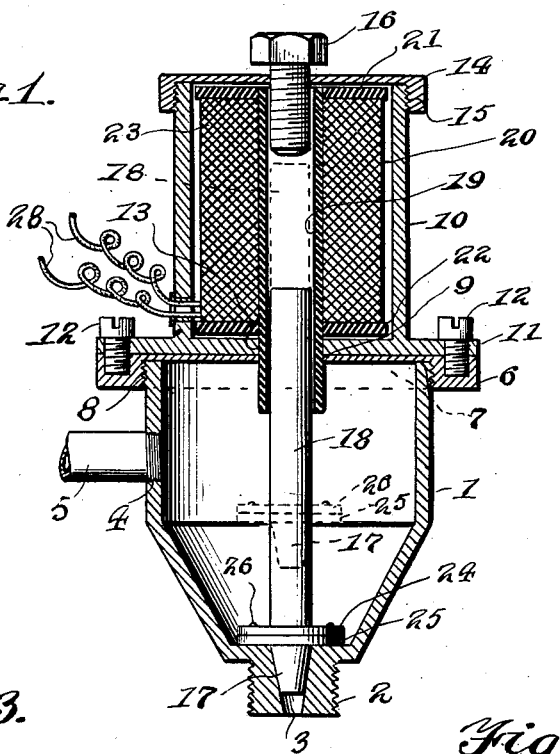
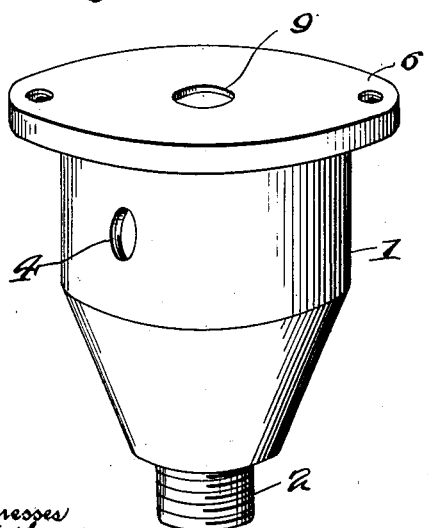
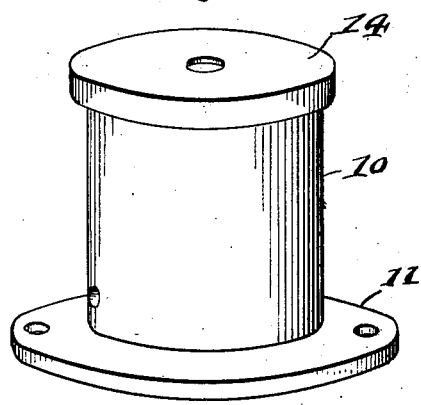
Inventor
George M. Rogers.
Witnesses
By Victor J. Evans
Attorney

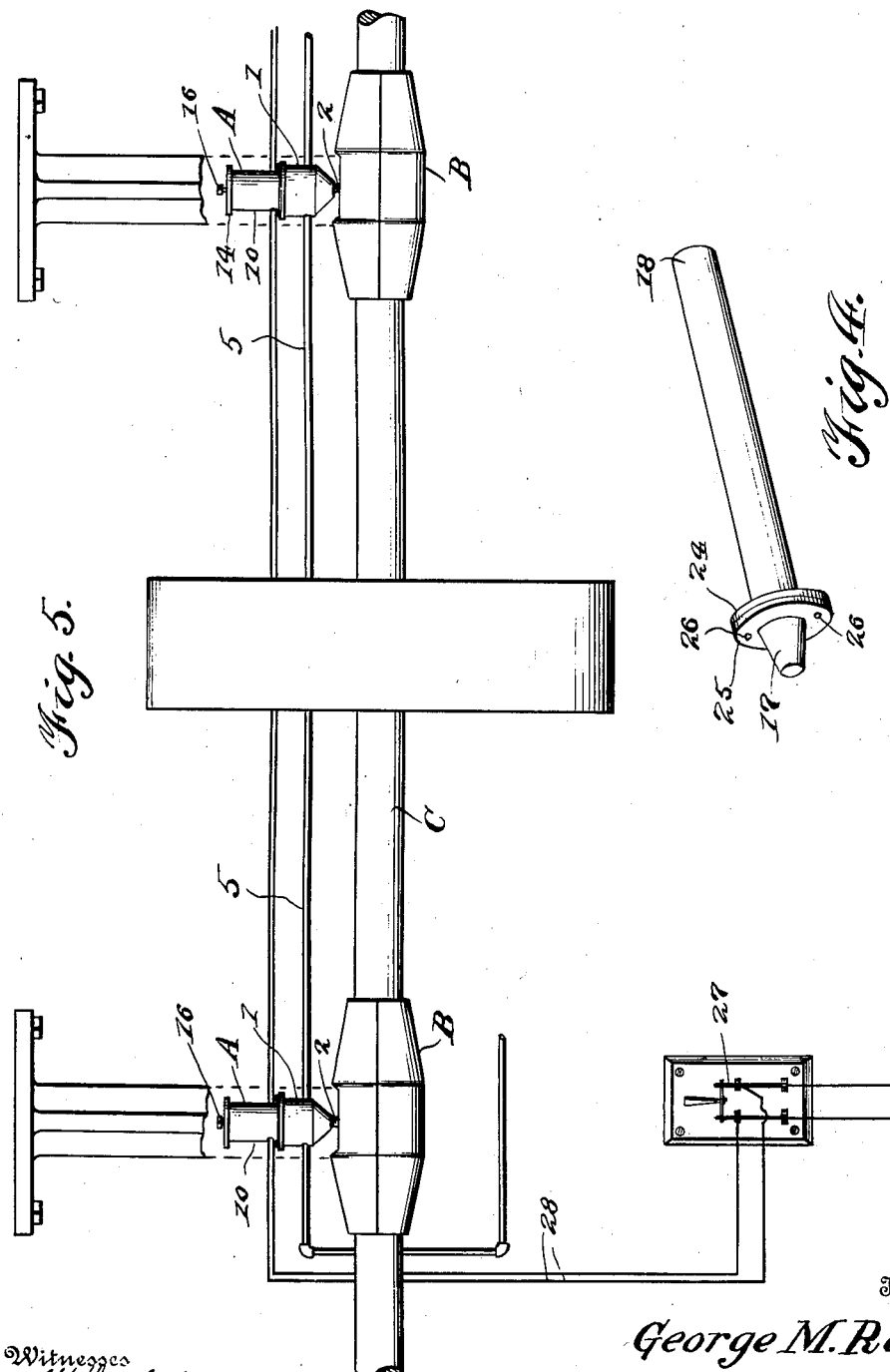

UNITED STATES PATENT OFFICE.

GEORGE M. ROGERS, OF CHICAGO, ILLINOIS.

MACHINE-OILER.

1,186,439.   Specification of Letters Patent.   Patented June 6, 1916.

Application filed October 23, 1915. Serial No. 57,484.

*To all whom it may concern:*

Be it known that I, GEORGE M. ROGERS, a citizen of the United States, residing at Chicago, in the county of Cook and State of Illinois, have invented new and useful Improvements in Machine-Oilers, of which the following is a specification.

This invention relates to improvements in oilers for applying lubricating oil to bearings or other machine elements, the object of the invention being to provide an improved oiler of this class which is simple in construction and which embodies electrically actuated means for opening a valve and permitting the feeding of oil from the cup to a bearing or other machine element at will, another object of the invention being to provide electrically actuated means for simultaneously operating the valves of any desired number of the oilers and thus permitting of the bearings of a line shaft or any desired number of machine elements to be lubricated at any time desired and with but very slight effort on the part of the attendant.

The invention consists in the construction, combination and arrangement of devices hereinafter described and claimed.

In the accompanying drawings:—Figure 1 is a vertical sectional view of an electrically operated oiler constructed in accordance with my invention and showing the valve in raised, open position, in dotted lines, and showing the valve in lowered, closed position in full lines. Figs. 2, 3, and 4 are detail views. Fig. 5 is a diagrammatic elevation of a line shaft and its bearings provided with a plurality of my improved oilers, one for each bearing, and an electric circuit and switch for simultaneously, electrically operating the oilers.

My improved oiler comprises a cup 1 of suitable shape and dimensions and which is here shown as provided at its lower end with a threaded nipple 2 adapted to be screwed in an opening of a bearing or other machine element which it is desired to lubricate. A downwardly tapering oil feed opening 3 extends through the bottom of the cup and also through the nipple. In one side of the cup is a threaded opening 4 to which is attached an oil feed pipe 5 which serves to keep the cup supplied with lubricating oil from a suitable tank or other reservoir.

A head 6 is provided in its under side with a circular recess 7 and with screw threads 8 which engage corresponding threads at the upper end of the cup and so that the head is screwed and secured to the cup. The head has a central opening 9.

Above the cup is a casing 10 which is cylindrical in form and is provided with an enlarged circular base 11 which bears on the head 6 and is secured thereto by screws 12. The base has a central circular opening 13 of suitable diameter. A cap 14 is provided for the upper end of the casing and is screwed thereto as at 15 and is provided with a centrally threaded opening which is engaged by an adjusting screw 16.

A valve 17 is provided to open and close the oil feed opening 3 of the cup and is tapered to fit in said opening. The valve is formed at the lower end of a plunger rod 18 which is made of steel and is arranged to operate vertically in the tubular core or sleeve 19 of a solenoid spool 20 which comprises an upper head 21 and a lower head 22, on the said tubular core or sleeve, the lower head 22 being spaced from the lower end of said core or sleeve and said lower end of the core or sleeve extending down through the central openings in the base 11 and head 6 and projecting into the upper portion of the cup. The windings of the solenoid are indicated at 23. The screw 16 extends downwardly into the upper end of the core or sleeve 19 and serves to limit the upward movement of the plunger with the valve 17, when the solenoid is energized. The plunger is provided at a suitable distance from its lower end with a disk 24 which is preferably made of brass and is screwed to the said plunger, said plunger being also provided on the lower side of said disk, with a gasket 25 of rubber or other suitable material and which is riveted to said disk as at 26 or otherwise suitably secured thereto and which is adapted, when the plunger with the valve 17 is lowered, to bear on the bottom of the cup, around the opening 3, and prevent a leakage through said opening. The plunger with the valve, when the solenoid is deënergized, drops by gravity so that normally, the valve is in closed position in the opening 3. The windings of the solenoid are included in circuit with a battery or other source of electricity and also with a suitable switch 27, by suitable conducting wires. When the switch is opened, the solenoid is deënergized and the valve is in closed position. When it is desired to supply oil to the bearing or other machine element to which the cup is connected, the switch is closed so that the solenoid is energized and the valve raised to open position.

In Fig. 5 of the drawings, I show a plurality of the oilers at A each connected to a bearing B of a line shaft C and also connected to a common oil feed pipe 5. The windings of the solenoids of the oilers A are included in a common circuit by the conductors 28 so that when the switch 27 is closed, the valves of all of the oilers are simultaneously raised to open position and hence the oil is simultaneously supplied to all the bearings of the line shaft.

Having described the invention, what is claimed is:

An oiler of the class described comprising a cup having an oil feed opening, a valve arranged for vertical movement and to normally close said opening by gravity, a solenoid core piece connected to said valve, a solenoid coil arranged above the cup and having a tubular sleeve in which the solenoid core piece is guided, a casing on the cup and in which the solenoid coil is arranged, said casing having a cap, and an adjusting screw in said cap, and arranged in the guide sleeve of the solenoid coil spool and to engage the upper end of the solenoid core piece and hence regulate the upward movement of said solenoid core piece and the valve.

In testimony whereof I affix my signature in presence of two witnesses.

GEORGE M. ROGERS.

Witnesses:
CHARLES RINGER,
MARION BELL.